(12) United States Patent
Aufrere et al.

(10) Patent No.: US 7,021,706 B2
(45) Date of Patent: Apr. 4, 2006

(54) VEHICLE SEAT WITH PROTECTION FROM SHOCK LOADS

(75) Inventors: Christophe Aufrere, Marcoussis (FR); Laurent Liaigre, Combs la Ville (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 110 days.

(21) Appl. No.: 10/755,782

(22) Filed: Jan. 12, 2004

(65) Prior Publication Data

US 2004/0164595 A1 Aug. 26, 2004

(30) Foreign Application Priority Data

Jan. 14, 2003 (FR) .................................. 03 00351

(51) Int. Cl.
*B60N 2/427* (2006.01)

(52) U.S. Cl. ............................. 297/216.14; 297/216.13; 297/285

(58) Field of Classification Search ........... 297/216.13, 297/216.14, 216.1, 285, 299, 301.1, 354.11
See application file for complete search history.

(56) References Cited

U.S. PATENT DOCUMENTS

| 1,827,928 | A | * | 10/1931 | Berger .......................... 297/291 |
| 2,020,438 | A | * | 11/1935 | Smith ........................... 297/285 |
| 2,366,730 | A | * | 1/1945 | Hickman ....................... 297/285 |
| 2,554,490 | A | * | 5/1951 | Eames ......................... 297/301.1 |
| 4,602,818 | A | * | 7/1986 | Korn ........................... 297/301.1 |
| 5,558,398 | A | * | 9/1996 | Santos ......................... 297/284.3 |
| 5,961,182 | A | * | 10/1999 | Dellanno .................... 297/216.12 |
| 6,024,406 | A | | 2/2000 | Charras et al. |
| 6,062,642 | A | | 5/2000 | Sinnhuber et al. |
| 6,109,692 | A | | 8/2000 | Haland et al. |
| 6,398,299 | B1 | | 6/2002 | Angerer et al. |

FOREIGN PATENT DOCUMENTS

| EP | 0 754 590 A2 | 1/1997 |
| EP | 0 725 740 B1 | 4/1998 |
| EP | 0 888 926 A1 | 1/1999 |
| GB | 2 283 163 A | 5/1995 |
| JP | 10080338 | 3/1998 |

OTHER PUBLICATIONS

French International Search Report, FR 0300351; report dated Sep. 24, 2003.

* cited by examiner

*Primary Examiner*—Peter R. Brown
(74) *Attorney, Agent, or Firm*—Marshall, Gerstein & Borun LLP

(57) ABSTRACT

A vehicle seat comprising a rigid support structure provided with a rear central beam, which structure carries a headrest, a seat proper, and a seat back carried by the central beam. The seat back is pivotally mounted on the central beam via two couplings that enable the seat back to move rearwards, under a force greater than a predetermined limit value.

10 Claims, 4 Drawing Sheets

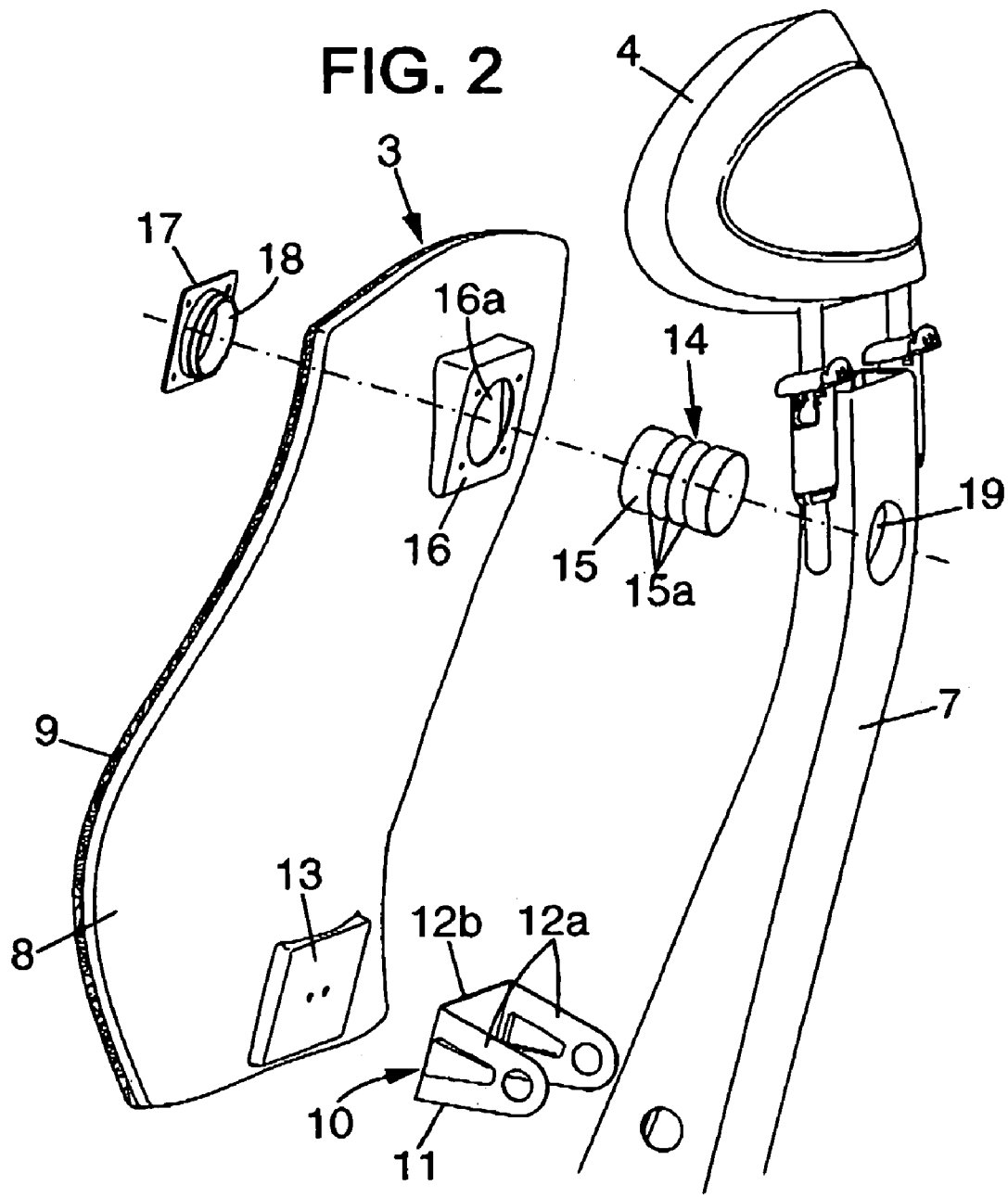

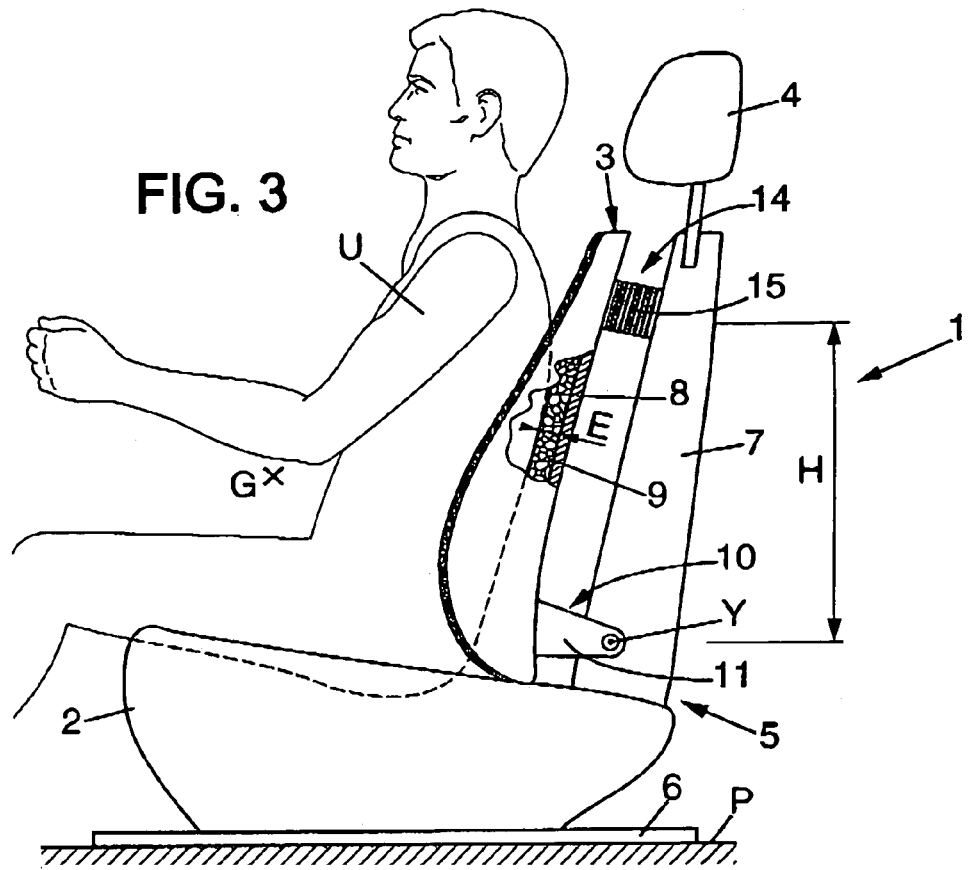

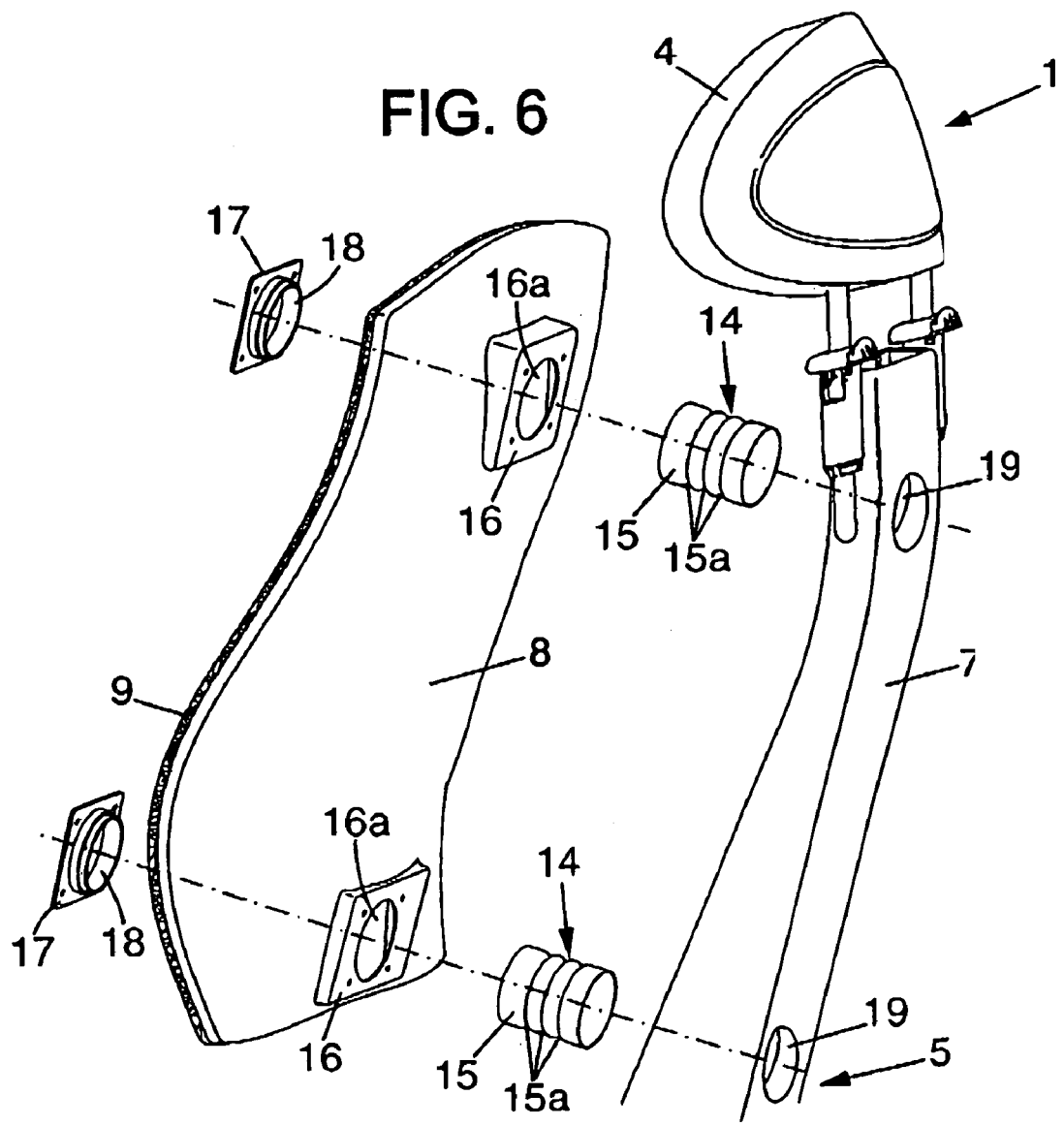

VEHICLE SEAT WITH PROTECTION FROM SHOCK LOADS

FIELD OF THE INVENTION

The present invention relates to vehicle seats that protect their users from the effects of a rear impact to which the vehicle might be subjected.

BACKGROUND OF THE INVENTION

More particularly, the invention relates to a vehicle seat comprising a rigid support structure, a seat proper, a seat back provided with a rigid framework carried by the support structure, and a headrest, the framework of the seat back being connected to the support structure via at least first and second couplings that are disposed at different heights and that are adapted:

normally, to hold the seat back in an in-use position; and
when the seat back is subjected to high rearward stress, greater than a predetermined limit, to enable at least a top portion of the seat back to move rearwards at least to a safety position.

Document U.S. Pat. No. 6,109,692 gives an example of such a seat that suffers from the drawback of having a voluminous seat back.

OBJECTS AND SUMMARY OF THE INVENTION

A particular object of the present invention is to mitigate that drawback.

To this end, according to the invention, the support structure comprises a substantially vertical central beam connected to the framework of the seat back by the first and second couplings, said central beam carrying the headrest.

In preferred embodiments of the invention it is optionally possible also to use one or more of the following provisions:

the first coupling is situated in the vicinity of the seat proper of the seat, and the second coupling connects the framework of the seat back to the central beam of the support structure, above said first coupling;

the framework of the seat back comprises a substantially rigid shell that covers substantially the entire rear face of the seat back, the front face of said shell being covered with a flexible lining, which has a thickness smaller than 60 millimeters (mm), and preferably about 30 mm;

the second coupling comprises at least one energy dissipator member which is adapted to deform plastically when the seat back of the seat is subjected to a rearward force that is greater than a first limit value at said second coupling;

said first limit value lies in the range 800 Newtons (N) to 1500 N;

said energy dissipator member is adapted to deform elastically when the framework of the seat back is subjected to a rearward force less than said first limit value at said second coupling, so as to filter out vibration coming from the vehicle;

the first coupling is adapted to deform elastically when the seat back, at said first coupling, is subjected to a force less than said second predetermined limit value, so as to filter out vibration coming from the vehicle;

the first coupling connects the framework of the seat back to the central beam in a manner such as to pivot about a transverse horizontal pivot axis;

the first coupling is plastically deformable so as make it possible for a bottom portion of the seat back to move rearwards when the seat back, at said first coupling, is subjected to a rearward force greater than a second predetermined limit value;

said second predetermined limit value lies in the range 2500 N to 5000 N; and the first coupling is adapted to deform elastically when the seat back, at said first coupling, is subjected to a force less than said second predetermined limit value, so as to filter out vibration coming from the vehicle.

BRIEF DESCRIPTION OF THE DRAWINGS

Other characteristics and advantages of the invention appear from the following description of two embodiments thereof, given by way of non-limiting example, and with reference to the accompanying drawings.

In the drawings:

FIG. 2 is an exploded fragmentary view of the seat of FIG. 1;

FIG. 3 diagrammatically shows a seat having the strength members of FIG. 1, with its back in the normal in-use position;

FIGS. 4 and 5 are views similar to FIG. 3, showing the seat in its safety position when the vehicle in which it is installed is subjected to a rear impact, respectively at the beginning of the impact and as the movement continues; and FIG. 6 is a view similar to FIG. 3, for a second embodiment of the invention.

MORE DETAILED DESCRIPTION

Figure 1:
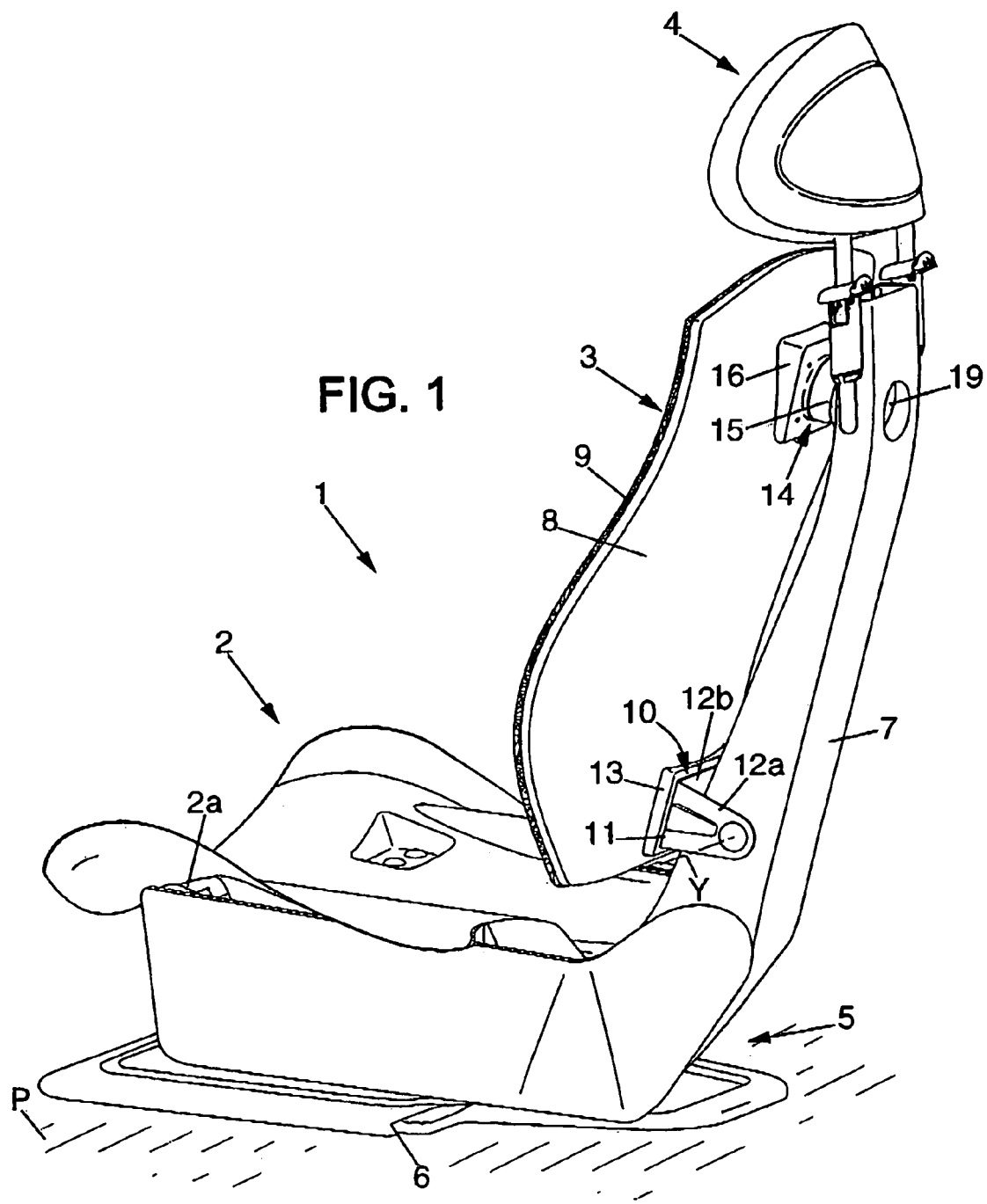
FIG. 1 is a perspective view of the strength members of a first embodiment of a seat of the invention.

In the various figures, like references designate elements that are identical or similar.

FIG. 1 shows the framework of a motor vehicle seat 1, e.g. a front seat, which comprises:

a seat proper 2 having a rigid framework 2a;
a seat back 3; and
a headrest 4 disposed above and slightly behind the seat back 3.

The seat back 3 is carried by a support structure 5 which, in the example shown in the drawings, comprises at least a portion of the framework 2a of the seat proper, a base 6 fixed to the floor P of the vehicle and an upright rear portion 7, consisting, for example, of a substantially vertical beam to the top end of which the headrest 4 is fixed.

The seat back 3 has a substantially rigid framework 8 consisting, for example, of a shell made of a plastics material or of some other material, optionally reinforced by inserts made of metal or of some other material. The shell 8 forms the rear portion of the seat back 3 and its front is covered with a padding 9 or with some other flexible lining. The padding 9 may, for example, consist of a layer of synthetic foam or the like, whose front face is covered by a seat trim cover made of textile, leather, or of some other material.

In the example considered herein, the padding 9 may be of relatively small thickness E (see FIG. 3), which may, in particular, be smaller than 60 mm, e.g. about 30 mm.

The framework 8 of the seat back is connected to the support structure 5 via a first coupling 10 which makes it possible for said framework 8 to move between a normal in-use position, shown in FIG. 3, in which the head of a user U is spaced forwards of the headrest 4, and a safety position, shown in FIG. 4, in which the head of the user U is closer to the headrest 4.

In the example shown herein, the first coupling 10 is disposed close to the seat proper 2 of the seat, and it forms a coupling between the bottom end of the framework 8 and the beam 7, which coupling is mounted to pivot, about a transverse horizontal axis Y.

As can be seen in more detail in FIGS. 1 and 2, the first coupling 10 can, for example, comprise a coupling piece 11, in particular made of sheet metal. The coupling piece 11 is U-shaped with:

two side flanges 12a which flank the beam 7 and are connected to it in a manner such as to pivot about the axis Y; and a web 12b which interconnects the two flanges 12a and which is fixed to a mounting 13 that is part of the framework 8 of the seat back.

As can be seen in FIG. 3, the first coupling 10, and its pivot axis Y are situated below the center of gravity G of the user U as seated on the seat.

In addition, as can also be seen in FIGS. 1 and 2, the framework 8 of the seat back is also connected to the support structure 5 via a second coupling 14 which normally holds the seat back 3 in its in-use position relative to the support structure, but which is adapted to make it possible for the framework of the seat back to move towards its safety position, only when said framework of the seat back, at the coupling 14, is subjected to a rearward force higher than a first predetermined limit value F1. Said first limit value F1 can, for example, lie in the range 800 N to 1500 N.

The second coupling 14 is situated at a certain distance H above the coupling device 10 (see FIG. 3), and, for example, at least 40 centimeters (cm) above the seat proper 2, advantageously close to the top end of the seat back 3.

In the example shown in FIGS. 1 and 2, the second coupling 14 comprises a plastically deformable dissipator member 15. The dissipator member 15 can, in particular, consist of a sheet metal tube that can, for example, have annular corrugations or folds 15a that are perpendicular to its horizontal central axis, so as to facilitate it being deformed plastically by compression when the seat back 3 is subjected to a rearward force greater than said first limit value F1 at the second coupling 14.

The dissipator member 15 can, for example, be fitted:

at one of its ends onto a bushing 18 that is part of a support plate 17 which is fixed to a mounting 16 of the framework of the seat back, it being possible in particular for the plate 17 to be mounted on the mounting 16 from the front of the seat back before the padding 9 is put in place, in which case, the bushing 18 passes through an orifice 16a provided in the framework 8; and at the other of its ends into the front portion of a recess 19 provided in the vicinity of the top end of the beam 7, i.e. close to the headrest 4.

The above-described device operates as follows.

In the normal in-use position, shown in FIG. 3, the second coupling 14 holds the seat back in the in-use position, without the dissipator member 15 deforming plastically. In this position, the dissipator member 15 can however deform elastically over a small deformation amplitude, under the effect of vibration transmitted to the beam 7 by the body of the vehicle. It is thus possible to filter out the vibration coming from the vehicle, so that it is felt less acutely by the user as seated on the seat 1.

As can be seen in FIG. 4, when the vehicle in which the seat is installed is subjected to a rear impact that is sufficiently large, the user U exerts a large bearing force that is directed rearwards against the seat back 3, so that the rearward force to which the framework 8 of the seat back is subjected at the second coupling 14 exceeds said first predetermined limit F1.

In which case, the top portion of the seat back 3 pivots rearwards about the axis Y as indicated by the arrow 20, while the member 15 deforms plastically by being compressed, thereby absorbing a portion of the energy of the impact.

The head of the user U thus finds itself in the immediate vicinity of or even in contact with the headrest 4 as of the beginning of the rear impact, thereby making it possible to avoid or to limit any injuries suffered by the user U to the spinal column, due to "whiplash". In addition, since the axis Y is situated quite low, the movement of the head of the user U is substantially rectilinear.

Furthermore, as can be seen in FIG. 5, if the rear impact to which the vehicle is subjected is particularly violent, the first coupling 10 can even deform plastically so as also to enable the bottom portion of the seat back 3 to move rearwards as indicated by the arrow 21, this plastic deformation itself absorbing a portion of the energy from the impact.

In particular, the flanges 12a of the coupling piece 11 can be adapted to deform plastically, e.g. by crumpling, so as to make it possible for a rearward movement to take place as indicated by the arrow 21.

The flanges 12a of the coupling piece 11 can be adapted to deform plastically when a rearward force greater than a second predetermined limit value F2 is applied to the bottom end of the seat back 3, said second limit value being greater than said first limit value F1 and, for example, lying in the range 2500 N to 5000 N, and advantageously, in the range 3000 N to 4000 N.

Thus, when the vehicle in which the seat 1 is installed is subjected to a rear impact at relatively low speed, only the second coupling 14 deforms plastically, and the seat back 3 pivots rearwards. When the vehicle is subjected to a rear impact at a relatively high speed, the plastic deformation of the second coupling 14 is accompanied by plastic deformation of the first coupling 10, either subsequently or simultaneously, which makes it possible for both the head and the thorax of the user U to be retained simultaneously, with energy being dissipated.

It should be noted that, once the coupling piece 11 and/or the dissipator member 15 have been deformed plastically, it can be possible to replace them if the remainder of the structure of the seat has not been damaged.

The second embodiment of the invention, shown in FIG. 6, is similar to the first embodiment of the invention, and is thus not described again in detail herein.

The second embodiment of the invention differs from the first embodiment by the fact that the bottom portion of the framework 8 of the seat back is connected to the beam 7 via a device 14 identical or similar to the above-described second coupling 14, rather than by a pivotally mounted device as described above.

For example, the first coupling 14 comprises a plastically deformable dissipator member 15 which can, in particular, consist of a sheet metal tube advantageously provided with annular corrugations or folds 15a perpendicular to its horizontal central axis. For example, this dissipator member 15 may be connected by interfitting to the framework 8 of the seat back and to the beam 7, in the same way as the dissipator member 15 of the above-described second coupling 14.

The dissipator member 15 of the second coupling 14 can be adapted to deform plastically when the seat back 3 is subjected to a rearward force lying in the range 800 N to 1500 N at said second coupling, i.e. at the top of the seat back, while the dissipator member 15 of the first coupling 14 can be adapted to deform plastically when the seat back 3 is subjected to a rearward force that is greater than a second limit value lying, for example, in the range 2500 N to 5000 N at said first coupling 14, i.e. at the bottom of the seat back.

The second embodiment of the invention operates similarly to the way in which the first embodiment of the invention operates:

during normal use, the dissipator members 15 of the first and second couplings 14 do not deform plastically, but can, if necessary, deform elastically in order to filter out vibration coming from the vehicle;

when the vehicle is subjected to a rear impact at low speed, the dissipator members 15 of both of the first and second couplings 14 can deform elastically and/or plastically, thereby enabling either the entire seat back 3 to move substantially horizontally, or the top portion of the seat back 3 to pivot rearwards with the bottom dissipator member 15 flexing;

when the vehicle is subjected to a rear impact at high speed, the dissipator members 15 of the first and second couplings 14 are compressed plastically, thereby enabling the entire seat back 3 to move substantially horizontally rearwards.

We claim:

1. A vehicle seat comprising a rigid support structure, a seat proper, a seat back provided with a rigid framework carried by the support structure, and a headrest, the framework of the seat back being connected to the support structure via at least first and second couplings that are disposed at different heights and that are adapted:

normally, to hold the seat back in an in-use position; and when the seat back is subjected to high rearward stress, greater than a predetermined limit, to enable at least a top portion of the seat back to move rearwards at least to a safety position;

in which seat the support structure comprises a substantially vertical central beam connected to the framework of the seat back by the first and second couplings, said central beam carrying the headrest independently of the seat back, said seat back being situated at a distance of said central beam, forward to said central beam, and said seat back extending laterally outwardly further than said central beam in opposite directions.

2. A seat according to claim 1, in which the first coupling is situated in the vicinity of the seat proper of the sear, and the second coupling connects the framework of the seat back to the central beam of the support structure, above said first coupling.

3. A seat according to claim 1, in which the framework of the seat back comprises a substantially rigid shell that covers substantially the entire rear face of the sear back, the front face of said shell being covered with a flexible lining, which has a thickness smaller that 60, mm and preferably about 30 mm.

4. A seat according to claim 1, in which the second coupling comprises at least one energy dissipater member which is adapted to deform plastically when the seat back of the seat is subjected to a rearward force that is greater than a first limit value at said second coupling.

5. A seat according to claim 4 in which said first limit value lies in the range 800 N to 1500 N.

6. A seat according to claim 1, in which the first coupling connects the framework of the seat back to the central beam in a manner such as to pivot about a transverse horizontal pivot axis.

7. A seat according to claim 1, in which the first coupling is plastically deformable so as to make it possible for a bottom portion of the seat back to move rearwards when the seat back, at said first coupling, is subjected to a rearward force greater than a second predetermined limit value.

8. A seat according to claim 7, in which said second predetermined limit value lies in the range 2500N to 5000N.

9. A vehicle seat comprising a rigid support structure, a seat proper, a seat back provided with a rigid framework carried by the support structure, and a headrest, the framework of the seat back being connected to the support structure via at least first and second couplings that are disposed at different heights and that are adapted:

normally, to hold the seat back in an in-use position; and when the seat back is subjected to high rearward stress, greater than a predetermined limit, to enable at least a top portion of the seat back to move rearwards at least to a safety position;

in which seat the support structure comprises a substantially vertical central beam connected to the framework of the seat back by the first and second couplings, said central beam carrying the headrest;

in which the second coupling comprises at least one energy dissipater member which is adapted to deform plastically when the seat back of the seat is subjected to a rearward force that is greater than a first limit value at said second coupling; and in which said energy dissapator member is adapted to deform elastically when the framework of the seat back is subjected to a rearward force less than said first limit value at said second coupling, so as to filter out vibration coming from the vehicle.

10. A vehicle seat comprising a rigid support structure, a seat proper, a seat back provided with a rigid framework carried by the support structure, and a headrest, the framework of the seat back being connected to the support structure via at least first and second couplings that are disposed at different heights and that are adapted:

normally, to hold the seat back in an in-use position; and when the seat back is subjected to high rearward stress, greater than a predetermined limit, to enable at least a top portion of the seat back to move rearwards at least to a safety position;

in which seat the support structure comprises a substantially vertical central beam connected to the framework of the seat back by the first and second couplings, and central beam carrying the headrest;

in which the first coupling is plastically deformable so as to make it possible for a bottom portion of the seat back to move rearwards when the seat back, at said first coupling, is subjected to a rearward force greater than a second predetermined limit value; and in which the first coupling is adapted to deform elastically when the seat back, at said first coupling, is subjected to a force less than said second predetermined limit value, so as to filter out vibration coming from the vehicle.

* * * * *

UNITED STATES PATENT AND TRADEMARK OFFICE
CERTIFICATE OF CORRECTION

PATENT NO. : 7,021,706 B2 Page 1 of 1
APPLICATION NO. : 10/755782
DATED : April 4, 2006
INVENTOR(S) : Christophe Aufrere et al.

It is certified that error appears in the above-identified patent and that said Letters Patent is hereby corrected as shown below:

In the Claims:

In Claim 2, at Column 5, line 50 "sear" should be -- seat --,

In Claim 3, at Column 5, line 56, "sear" should be -- seat --,

In Claim 3, at Column 5, line 58, "60, mm" should be -- 60 mm --.

Signed and Sealed this

First Day of May, 2007

JON W. DUDAS
*Director of the United States Patent and Trademark Office*